(12) United States Patent
Higashira

(10) Patent No.: US 9,828,497 B2
(45) Date of Patent: Nov. 28, 2017

(54) COATING AGENT COMPOSITION

(71) Applicant: NOK CORPORATION, Tokyo (JP)

(72) Inventor: Toshihiro Higashira, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 14/430,527

(22) PCT Filed: Sep. 20, 2013

(86) PCT No.: PCT/JP2013/075431
§ 371 (c)(1),
(2) Date: Mar. 23, 2015

(87) PCT Pub. No.: WO2014/050722
PCT Pub. Date: Apr. 3, 2014

(65) Prior Publication Data
US 2015/0252181 A1    Sep. 10, 2015

(30) Foreign Application Priority Data

Sep. 25, 2012  (JP) ................................ 2012-210315

(51) Int. Cl.
*C08L 27/18* (2006.01)
*C09D 109/02* (2006.01)
*C09D 5/02* (2006.01)

(52) U.S. Cl.
CPC .............. *C08L 27/18* (2013.01); *C09D 5/022* (2013.01); *C09D 109/02* (2013.01); *C08L 2205/03* (2013.01); *C08L 2205/035* (2013.01); *Y10T 428/31544* (2015.04)

(58) Field of Classification Search
None
See application file for complete search history.

(56) References Cited

U.S. PATENT DOCUMENTS

| | | | |
|---|---|---|---|
| 4,297,447 A | 10/1981 | Yasuda | |
| 4,596,839 A | 6/1986 | Peters | |
| 5,198,491 A * | 3/1993 | Honda | A47J 36/02 126/390.1 |
| 5,272,202 A | 12/1993 | Kubo et al. | |
| 5,651,995 A | 7/1997 | Oyama et al. | |
| 5,763,068 A * | 6/1998 | Kishino | B32B 25/00 428/323 |
| 2004/0167263 A1 | 8/2004 | Bate | |
| 2005/0233152 A1* | 10/2005 | Bate | C09D 133/04 428/421 |
| 2006/0142493 A1* | 6/2006 | Hughes | C08F 2/24 525/210 |

FOREIGN PATENT DOCUMENTS

| | | |
|---|---|---|
| DE | 26 22 343 A1 | 5/1976 |
| JP | 2-178305 | 7/1990 |
| JP | 08-048934 | 2/1996 |
| JP | 8-100085 | 4/1996 |
| JP | 2002-188051 | 7/2002 |
| JP | 2003-026997 | 1/2003 |
| JP | 2003-073611 | 3/2003 |
| JP | 2006-511674 A | 4/2006 |
| JP | 2008-281023 | 11/2008 |
| JP | 2011-190412 | 9/2011 |

OTHER PUBLICATIONS

International Search Report from corresponding PCT application No. PCT/JP2013/075431 dated Dec. 3, 2013 (4 pgs).
International Preliminary Report on Patentability and Written Opinion from corresponding PCT application No. PCT/JP2013/075431 dated Mar. 31, 2015 (6 pgs).

* cited by examiner

*Primary Examiner* — Callie Shosho
*Assistant Examiner* — Patrick English
(74) *Attorney, Agent, or Firm* — Brinks Gilson & Lione

(57) ABSTRACT

Disclosed is a coating agent composition comprising (A) a polytetrafluoroethylene resin emulsion, (B) an urethane resin emulsion, and (C) a hydrogenated NBR emulsion, and preferably further comprising (D) an acrylic resin emulsion and/or an ethylene-vinyl acetate copolymer resin emulsion. When this coating agent composition is used as a surface coating agent for general vulcanized rubber-molded products, evaluation of adhesion to rubber by an adhesion test is hardly impaired, and bleeding evaluation, evaluation of the flexibility of the coating agent by a bending test, and evaluation of the reduction in adhesion to rubber due to bloom from the rubber by a high-temperature and high-humidity test are all satisfied.

12 Claims, No Drawings

COATING AGENT COMPOSITION

RELATED APPLICATION

This application is a 35 U.S.C. §371 national phase filing of International Patent Application No. PCT/JP2013/075431, filed Sep. 20, 2013, through which and to which priority is claimed under 35 U.S.C. §119 to Japanese Patent Application No. 2012-210315, filed Sep. 25, 2012, the entire disclosure of which is hereby expressly incorporated by reference.

TECHNICAL FIELD

The present invention relates to a coating agent composition. More particularly, the present invention relates to a coating agent composition that can be effectively used, for example, as a surface coating agent for vulcanized rubber-molded products.

BACKGROUND ART

Various surface coating agents using resin aqueous emulsions have been proposed as surface coating agents for vulcanized rubber-molded products.

Patent Document 1 proposes using, as a coating agent for electrophotographic device members, a material comprising, as a main component, an urethane resin emulsion obtained by chain-extending with water an NCO-terminated polyurethane prepolymer obtained from a polyolefinpolyol, diisocyanate and glycol, while dispersing the prepolymer in the water.

When the coating agent comprising the urethane resin emulsion is used as a surface coating agent for general vulcanized rubber-molded products, among various measurement items shown in Examples, described later, bleeding evaluation (70° C., 30 days), evaluation of the flexibility of the coating agent by a bending test, and evaluation of adhesion to vulcanized rubber by an adhesion test show satisfactory results; however, evaluation of adhesion to vulcanized rubber due to bloom from the rubber by a high-temperature and high-humidity test shows unsatisfactory results.

Patent Document 2 discloses a coating composition for top-coating used on an organic resin based-undercoat layer, the composition comprising:

(a) an organosilane or a hydrolyzate or condensate thereof;

(b) a vinyl-based polymer containing a silyl group or a vinyl polymer containing a silyl group and an antraviolet-stabliity group; and (c) an organometallic compound that serves as a hydrolysis-condensation catalyst;

the composition having a specific weight ratio of component (b)/component (a).

Moreover, Patent Document 3 discloses an aqueous coating composition having excellent weather resistance, solvent resistance, etc., the composition comprising a combination of a liquid A comprising an acrylic resin emulsion with a liquid B essentially comprising a water-dispersible polyisocyanate, wherein the liquid A contains a copolymer of a hydroxyl group-containing polymerizable monomer and a cycloalkyl group-containing polymerizable monomer, and the equivalent ratio of the isocyanate groups of the liquid B to the hydroxyl groups of the liquid A is specified.

However, when the coating agent compositions of Patent Documents 2 and 3 were used as surface coating agents for general vulcanization-molded products, it was confirmed that although evaluation of adhesion to vulcanized rubber by an adhesion test showed superior results, the abovementioned other three evaluations, that is, bleeding evaluation, evaluation of the flexibility of the coating agent by a bending test, and evaluation of the reduction in adhesion to vulcanized rubber due to bloom from the rubber by a high-temperature and high-humidity test, showed inferior results.

PRIOR ART DOCUMENTS

Patent Documents

Patent Document 1: JP-A-2002-188051
Patent Document 2: JP-A-2003-26997
Patent Document 3: JP-A-2003-73611
Patent Document 4: JP-A-2-178305
Patent Document 5: JP-A-8-100085
Patent Document 6: JP-B-3032210

OUTLINE OF THE INVENTION

Problem to be Solved by the Invention

An object of the present invention is to provide a coating agent composition that satisfies, when used as a surface coating agent for general vulcanized rubber-molded products, bleeding evaluation, evaluation of the flexibility of the coating agent by a bending test, and evaluation of the reduction in adhesion to vulcanized rubber due to bloom from the rubber by a high-temperature and high-humidity test, while hardly impairing evaluation of adhesion to vulcanized rubber by an adhesion test.

Means for Solving the Problem

The above object of the present invention can be achieved by a coating agent composition comprising (A) a polytetrafluoroethylene resin emulsion, (B) an urethane resin emulsion, and (C) a hydrogenated NBR emulsion, and preferably further comprising (D) an acrylic resin emulsion and/or an ethylene-vinyl acetate copolymer resin emulsion.

Effect of the Invention

When used as a surface coating agent for general vulcanized rubber-molded products, the coating agent composition of the present invention has the effect of satisfying any of bleeding evaluation, evaluation of the flexibility of the coating agent by a bending test, and evaluation of adhesion to vulcanized rubber due to bloom from the rubber by a high-temperature and high-humidity test, without substantially impairing evaluation of adhesion to vulcanized rubber by an adhesion test.

The coating agent composition of the present invention having such an effect can be applied to general vulcanized rubber-molded products including, for example, seal parts such as O rings, oil seals, gaskets, diaphragms, and valves, as well as rubber parts such as rubber rolls and rubber belts for copying machines; rubber hoses, rubber belts, wipers for industrial use; weather strips and glass runs for vehicles; and can effectively prevent adhesion, achieve low friction, and prevent abrasion.

EMBODIMENTS FOR CARRYING OUT THE INVENTION

The PTFE that forms a polytetrafluoroethylene resin [PTFE] emulsion as component (A) may be, not only a homopolymer of tetrafluoroethylene [TFE], but also a copolymer of TFE and a small amount (several mol % or less) of perfluoroalkyl vinyl ether, hexafluoropropylene, ethylene, or the like, having a number average molecular weight Mn (measured by the method described in J. of Applied Polymer Science, vol. 17, pp. 3253-7, 1973) of preferably $2 \times 10^4$ to $1 \times 10^7$, more preferably $2 \times 10^5$ to $8 \times 10^6$. When a copolymer having an Mn less than this range is used, abrasion resistance, impact resistance, and non-adhesion properties tend to be deteriorated. In contrast, when a copolymer having an Mn greater than this range is used, the softness (flexibility) of the coating agent and the adhesion to an urethane binder tend to be deteriorated.

Moreover, the PTFE used has an average particle diameter (measured by a light-scattering method) of about 200 to 500 nm, preferably about 200 to 400 nm. When the average particle diameter is less than 200 nm, the particles are likely to be aggregated, and the coating surface is roughened. In contrast, when the average particle diameter exceeds 500 nm, the particles are likely to be deposited, and the stability of the aqueous emulsion is reduced. PTFE is generally obtained by an emulsion polymerization method, and a surfactant necessary for stabilization is added, if necessary, to the obtained aqueous dispersion to achieve concentration and stabilization.

PTFE has a particle shape. Due to its non-adhesive properties and low-frictional properties, and due to its high molecular weight and small particle size, PTFE can prevent bloom on the surface of vulcanized rubber, and delay the formation of bloom. Thus, PTFE emulsions can achieve low-frictional properties, reduced adhesion to mating materials to be sealed, prevention of bloom on the surface of vulcanized rubber, and the like.

In consideration of these properties of PTFE and PTFE emulsions, PTFE is used at a ratio of about 20 to 80 wt. %, preferably about 30 to 70 wt. %, based on the total solid matters content. When the ratio of the PTFE solid matters content is less than this range, the friction coefficient increases to facilitate adhesion, and bloom from vulcanized rubber cannot be prevented. In contrast, when the ratio of the PTFE solid matters content is greater than this range, not only adhesion to rubber and flexibility are deteriorated, but also aggregates of PTFE are formed on the coating surface to increase the surface roughness. In the case of seal parts, their sealing properties are reduced. Further, the aggregates are removed and become impurities.

Practically, the PTFE emulsion may be a commercial product, such as Polyflon Dispersion D-1 E (produced by Daikin Industries, Ltd.) or Fluon PTFE AD911E (produced by Asahi Glass Co., Ltd.), which can be used directly or after appropriate dilution.

The urethane resin emulsion as component (B) may be a one-liquid type emulsion in which an urethane prepolymer obtained by the reaction of a compound having two or more active hydrogen atoms with an organic polyisocyanate is dispersed in water, as described, for example, in Patent Document 1.

The compound having two or more active hydrogen atoms is polyether, polyester, polyether ester, polythioether, polyacetal, polybutadiene, polysiloxane, or the like, having two or more hydroxyl groups, carboxyl groups, amino groups, mercapto groups, or the like, at the molecular terminal or in the molecule; preferably polyether or polyester having two or more hydroxyl groups at the molecular terminal. Further, the compound having two or more active hydrogen atoms may be blended with a chain extender, if necessary.

Specific examples of polyester polyols having two or more hydroxyl groups in the molecule include polyester polyols obtained from dicarboxylic acids (e.g., adipic acid, sebacic acid, itaconic acid, maleic acid anhydride, terephthalic acid, isophthalic acid, fumaric acid, succinic acid, oxalic acid, malonic acid, glutaric acid, pimelic acid, suberic acid, or azelaic acid) and polyol compounds (e.g., ethylene glycol, diethylene glycol, propylene glycol (1,2-propanediol, 1,3-propanediol), 1,4-butanediol, 1,6-hexanediol, neopentyl glycol, 1,9-nonanediol, 3-methyl-1,5-pentanediol, tripropylene glycol, trimethylolpropane, or glycerol); polylactone-based polyester polyols, such as polycaprolactone polyol and poly β-methyl-δ-valerolactone; polycarbonate polyols; and the like.

Moreover, examples of organic polyisocyanates include commonly used linear, alicyclic aliphatic, or aromatic organic polyisocyanates. Examples thereof include aliphatic diisocyanates including alicyclic diisocyanates, such as 1,4-tetramethylene diisocyanate, 1,6-hexamethylene diisocyanate, 2,2,4-trimethylhexamethylene diisocyanate, 3-isocyanatemethyl-3,5,5-trimethylcyclohexyl isocyanate, dicyclohexylmethane-4,4'-diisocyanate, methylcyclohexyl-2,4-diisocyanate, methylcyclohexyl-2,6-diisocyanate, 1,3-bis(isocyanate)methylcyclohexane, transcyclohexane-1,4-diisocyanate, lysine diisocyanate, dicyclohexylmethane diisocyanate, isophorone diisocyanate, and hydrogenated xylylene diisocyanate; aromatic diisocyanates, such as tolylene diisocyanate, xylylene diisocyanate, tetramethylxylylene diisocyanate, 2,4-toluylene diisocyanate, 2,6-toluylene diisocyanate, diphenylmethane-4,4'-diisocyanate, naphthalene diisocyanate, 1,5'-naphthalene diisocyanate, tolidine diisocyanate, tetraalkyldiphenylmethane diisocyanate, 4,4'-dibenzyl diisocyanate, and 1,3-phenylene diisocyanate; triisocyanates, such as lysine ester triisocyanate, triphenylmethane triisocyanate, 1,6,11-undecanetriisocyanate, 1,8-isocyanate-4,4-isocyanatemethyloctane, 1,3,6-hexamethylene triisocyanate, bicycloheptane triisocyanate, an adduct of trimethylolpropane and toluylene diisocyanate, and an adduct of trimethylolpropane and 1,6-hexamethylene diisocyanate; preferably organic polyisocyanates, such as tolylene diisocyanate, diphenylmethane diisocyanate, naphthalene diisocyanate, xylylene diisocyanate, hexamethylene diisocyanate, dicyclohexylmethane diisocyanate, isophorone diisocyanate, hydrogenated xylylene diisocyanate, and tetramethylxylylene diisocyanate; or mixtures thereof.

Each of these monomers is reacted in the presence of a hydrophilic volatile solvent, such as acetone or methyl ethyl ketone, to synthesize a polyurethane resin. Then, the polyurethane resin can be converted into an urethane resin emulsion by a known method, such as acetone method, prepolymer mixing method, ketimine method, or hot-melt dispersion method.

In this case, a reaction control agent (e.g., phosphoric acid or benzoyl chloride); a reaction catalyst (e.g., dibutyltin dilaurate, stannous octoate, or triethylamine), and an organic solvent that is not reactive with isocyanate groups may be added, if necessary, during the reaction or after the completion of the reaction. Examples of the above organic solvent include acetone, methyl ethyl ketone, tetrahydrofuran, dioxane, ethyl acetate, toluene, xylene, and the like. In the above addition reaction method, stabilizers, such as an antioxidant and an ultraviolet absorber, can be further added, if necessary, during the reaction or after the completion of the reaction.

The method for dispersion in water is not particularly limited, and a conventionally known method can be used. Examples of the method include a dispersion method in which water is added to an organic phase while mechanical shearing force is applied by a high-speed dispersion machine, such as a homomixer or disper; a method in which an organic phase is added to an aqueous phase; and other methods. Variation in dispersion can be resolved by using such a mechanical dispersion method.

Dispersion in water may be performed in a batch mode, or a continuous mode such as a rotor stator mode, line mill mode, static mixer mode, vibration mode, ultrasonic mode, or high voltage mode. Moreover, when the dispersion method is carried out either in a batch or continuous mode, dispersion may be performed in connecting two or more facilities. Furthermore, the dispersing device used has one dispersion unit for dispersing a substance to be dispersed in water, and may also have two or more dispersion units.

The addition of an urethane resin emulsion has drawbacks in sliding properties and adhesion, but can increases adhesion to vulcanized rubber and flexibility due to the adhesion of the urethane resin.

Therefore, the ratio of the urethane resin used in the form of an emulsion is about 10 to 50 wt. %, preferably about 15 to 40 wt. %, based on the total solid matters content. When the ratio of the urethane resin is greater than this range, the friction coefficient increases to facilitate adhesion. In contrast, when the ratio of the urethane resin is less than this range, adhesion to vulcanized rubber and flexibility decrease.

Practically, the urethane resin emulsion may be a commercial product, such as UW-1005E (produced by Ube Industries, Ltd.) or U-Coat UWS-145 (produced by Sanyo Chemical Industries, Ltd.), which can be used directly or after appropriate dilution.

Moreover, the hydrogenated NBR emulsion as component (C) is, for example, an emulsion obtained by bringing an aqueous emulsion of NBR, while maintaining its emulsion state, into contact with gaseous or dissolved hydrogen in the presence of a Pd compound hydrogenation catalyst, and hydrogenating 50 to 99.95% of the C=C bonds (Patent Documents 4 and 5).

The hydrogenated NBR emulsion increases the friction coefficient and adhesion to mating materials to be sealed. Further, the hydrogenated NBR emulsion can improve the water resistance, flexibility and adhesion to vulcanized rubber, etc., of the urethane resin.

Therefore, the ratio of the hydrogenated NBR used in the form of an emulsion is about 3 to 50 wt. %, preferably about 5 to 40 wt. %, based on the total solid matters content. When the hydrogenated NBR is used at a ratio less than this range, adhesion to vulcanized rubber-molded products, flexibility, water resistance, and other properties tend to be worsened. In contrast, when the hydrogenated NBR is used at a ratio greater than this range, the friction coefficient increases to facilitate adhesion, and when substrates are brought into contact with each other during coating, they are likely to be adhered to each other.

When a non-hydrogenated NBR emulsion is used, water resistance is improved; however, compared to when a hydrogenated NBR emulsion is used, adhesion is higher, and coating film strength is insufficient, thereby causing removal of the coating film during adhesion.

Practically, the hydrogenated NBR emulsion may be a commercial product, such as ZLxB or ZLxA (produced by Zeon Corporation), which can be used directly or after appropriate dilution.

When at least one of an acrylic resin emulsion and an ethylene-vinyl acetate copolymer resin [EVA] emulsion, preferably both of them, are further used as component (D), in addition to the PTFE emulsion as component (A), the urethane resin emulsion as component (B), and the hydrogenated NBR emulsion as component (C), evaluation of adhesion to vulcanized rubber due to bloom from the rubber by a high-temperature and high-humidity test can be further improved.

The acrylic resin that forms an acrylic resin emulsion as component (D) may be a homopolymer or copolymer of an alkyl ester of acrylic acid or methacrylic acid. Such a homopolymer having a glass transition temperature of $-20°$ C. or lower is used. For example, an acrylic resin having a glass transition temperature of $-30°$ C. or lower is described in Patent Document 6. As the glass transition temperature is lower, adhesion becomes less, causing hardness and less friction. In contrast, when the glass transition temperature is higher than this range, adhesion is conversely higher, causing less strength and higher friction coefficient. Preferably, a polymer of an alkyl ester of methacrylic acid is used. Examples of the alkyl group of (meth)acrylic acid ester include $C_2$-$C_{16}$, preferably $C_2$-$C_{12}$, linear or branched alkyl groups.

The ratio of the acrylic resin used in the form of an emulsion is 0 to 50 wt. %, preferably about 5 to 30 wt. %, based on the total solid matters content. The addition of an acrylic resin emulsion reduces the friction coefficient, and makes adhesion to mating materials to be sealed difficult. In contrast, when the acrylic resin is used at a ratio greater than this range, adhesion to vulcanized rubber and flexibility decrease.

Practically, the acrylic resin emulsion may be a commercial product, such as Nikasol FX-329 or RX-66E (produced by Nippon Carbide Industries Co., Inc.), which can be used directly or after appropriate dilution.

Further, the ratio of the EVA used in the form of an emulsion is 0 to 50 wt. %, preferably about 5 to 40 wt. %, based on the total solid matters content. The addition of an EVA emulsion improves adhesion to vulcanized rubber, and increases flexibility. However, when the ratio of the EVA used is greater than this range, the friction coefficient increases to facilitate adhesion to mating materials to be sealed, and when the substrates are brought into contact with each other during coating, they are likely to be adhered together.

Practically, the EVA emulsion may be a commercial product, such as Nikasol ME-702XT (produced by Nippon Carbide Industries Co., Inc.) or Denka EVA Tex 80 (produced by Denki Kagaku Kogyo K.K.), which can be used directly or after appropriate dilution.

The coating agent composition is prepared by mixing the above emulsions; however, it is preferable that the blending components are supplied in a container in the following order, thereby preparing a coating agent having a solid matters content of about 5 to 50 wt. %, preferably about 10 to 40 wt. %.

(i) Ethylene-vinyl acetate copolymer resin [EVA] emulsion
(ii) Water
(iii) Hydrogenated NBR emulsion, acrylic resin emulsion
(iv) Urethane resin emulsion
(v) PTFE emulsion The coating of the coating agent composition to a vulcanized rubber-molded product is performed by a generally used coating method, such as spraying or dipping. The type of rubber of vulcanized rubber-molded products to be coated is not particularly limited. For example, the coating can be applied to vulcanization-molded products of NBR, hydrogenated NBR, acrylic rubber, fluororubber, and the like.

EXAMPLES

The following describes the present invention with reference to Examples.

Examples 1 to 5 and Comparative Examples 1 to 5

(1) In a container equipped with a stirrer, such as a rotor or propeller, the following components were supplied in this order:
(i) an ethylene-vinyl acetate copolymer resin [EVA] emulsion;
(ii) water;
(iii) a hydrogenated NBR emulsion, an acrylic resin emulsion;
(iv) an urethane resin emulsion; and
(v) a PTFE emulsion.

The resulting mixture was stirred until it was homogeneous, thereby preparing a coating agent having a solid matters content of 30 wt. %.

Here, the following commercial products were used as the respective blending components:
PTFE emulsion: Polyflon Dispersion D-1 E, produced by Daikin Industries, Ltd.; solid matters content: 61 wt. %, Mn: 6,000,000, average particle diameter: 220 nm
Urethane resin emulsion: UW-1005E, produced by Ube Industries, Ltd.; solid matters content: 27.4 wt. %
Hydrogenated NBR emulsion: ZLxB, produced by Zeon Corporation; solid matters content: 40.5 wt. %
Acrylic resin emulsion: Nikasol FX-329, produced by Nippon Carbide Industries Co., Inc.; solid matters content: 45 wt. %
Ethylene-vinyl acetate copolymer resin emulsion [EVA emulsion]: Nikasol ME-702XT, produced by Nippon Carbide Industries Co., Inc.; solid matters content: 56 wt. %
NBR emulsion: Nipol 1562, produced by Zeon Corporation; solid matters content: 41 wt. %

| | |
|---|---|
| (2) NBR (JSR N220S, produced by JSR) | 100 parts by weight |
| Carbon black (HTC#S-S, produced by NSCC Carbon Co., Ltd.) | 40 parts by weight |
| Zinc white No. 3 (produced by Seido Chemical Industry Co., Ltd.) | 5 parts by weight |
| Stearic acid (produced by Miyoshi Oil & Fat Co., Ltd.) | 2 parts by weight |
| Antioxidant (Santaito R, produced by Seiko Chemical Co., Ltd.) | 3 parts by weight |
| Antioxidant (6C, produced by Ouchi Shinko Chemical Industrial Co., Ltd.) | 2 parts by weight |
| Plasticizer (RS-107, produced by ADEKA) | 15 parts by weight |
| Sulfur (produced by Hosoi Chemical Industry Co., Ltd.) | 1.2 parts by weight |
| Vulcanization accelerator (Nocceler TT, produced by Ouchi Shinko Chemical Industrial Co., Ltd.) | 2 parts by weight |
| Vulcanization accelerator (Nocceler CZ, produced by Ouchi Shinko Chemical Industrial Co., Ltd.) | 2.5 parts by weight |

The above components were kneaded by a roll, and then subjected to press vulcanization at 180° C. for 6 minutes, thereby vulcanization-molding a 2-mm-thick sheet and an O ring.

(3) The surface of the press-vulcanized products was wiped with methyl ethyl ketone applied to a Kimwipe, and was spray-coated with the coating agent with a coating thickness of 5 to 10 μm, followed by heat treatment at 140° C. for 30 minutes. The vulcanizates after coating treatment were measured for the following items:

Dynamic Friction Coefficient:
Measured according to ASTM D-1894 (-11el), JIS K7125 (1999), JIS P8147 (2010), ISO 8295 (1995)
A surface property tester Heidon Tribogear (produced by Shinto Scientific Co., Ltd.) was used
The dynamic friction coefficient of the coated rubber sheet surface was measured under the following test conditions:
Mating material: SUS304 steel ball having a diameter of 10 mm
Moving rate: 50 mm/min
Load: 0.49 N
Amplitude: 50 mm Bending Test:
Measured according to JIS K5600-5-1 (1999), ISO 1519 (1973)
The rubber sheet after coating treatment was bent around a mandrel having a diameter of 6 mm, and tape peeling same as that of a multi-crossed cut test was performed on the rubber sheet in a bent state. Then, whether the coating agent was removed, that is, the flexibility of the coating agent, was evaluated according to the following evaluation criteria:
○: No removal in the bent portion and no transfer to the tape
X: Removal in the bent portion and transfer to the tape occurred Adhesion Test:
The rubber sheet after coating treatment was punched into a disc having a diameter of 13 mm, and left at room temperature for one week. Then, the rubber sheet disc and a mating material SUS430 were held at a compression ratio of 33.3% so that their coating layers faced each other. After heating at 100° C. for 60 minutes, they were left at room temperature for 1 hour. After the compression mold was removed, the transfer of the coating agent to the metal due to the adhesion of the coating agent to the SUS430 was evaluated as a test of adhesion to metal according to the following evaluation criteria:
○: No transfer of the coating agent to SUS430
Δ: Partial transfer of the coating agent to SUS430
×: Transfer of the coating agent to the entire compression surface of SUS430 after removing the mold
Notes: The coating agent is transferred to the mating material metal side, for example, when the adhesion between the vulcanized rubber and the coating agent is weak, when the adhesion is reduced due to bloom from the vulcanized rubber, or when the coating agent is sticky High-Temperature and High-Humidity Test:
A test of adhesion to vulcanized rubber and a water resistance test according to JIS K6262 (2006) corresponding to ASTM D395
Coating was applied to the vulcanization-molded O rings (inner diameter: 34.7 mm, thickness: 3.5 mm) in the same manner as described above. The two O rings were piled together and compressed under conditions in which the compression ratio was 20%, the temperature was 60° C., the humidity was 90% RH, and the time was 70 hours. After the compression test, the removal state of the coating agent between the O rings was evaluated according to the following criteria:
- ○: No removal of the coating agent
- Δ: Removal of part of the coating agent occurred on the O ring compression surface
- ×: Removal of the coating agent occurred on the almost entire O ring compression surface Notes: The removal of the coating agent occurs due to, for example, water present in the compression surface edges of the O rings, adhesion between the O rings, hydrolysis of the urethane resin, or reduced adhesion between the urethane resin and the vulcanized rubber Bleeding Evaluation:

A heat test was performed on the sheets at 70° C. for 30 days. Then, whether bloom components from the vulcanized rubber were deposited on the coating surface was visually observed. The results were evaluated according to the following criteria:
- ○: No deposition of solid matters on the surface recognized
- ×: Deposition of solid matters on the surface recognized Evaluation of O Ring Conveying Properties:

Coating was applied to the vulcanization-molded O rings (inner diameter: 7.8 mm, thickness: 1.9 mm; bearing number: JIS B2401-4 Type D P8 corresponding to ASTM D2240 and D1414) in the same manner as described above, and the conveying properties of the O rings by a parts feeder were evaluated according to the following criteria:
- ○: No O rings were conveyed in a piled state, and the conveying speed was faster than that of silicone oil-applied O rings without coating treatment
- Δ: Although the conveying speed was faster than that of silicone oil-applied O rings without coating treatment, some O rings were conveyed in a state in which two or more O rings were piled together
- ×: The conveying speed was equal to or slower than that of silicone oil-applied O rings without coating treatment Notes: When uncoated vulcanized rubber to which silicone oil has been applied is conveyed, the stickiness of the silicone oil causes a slow conveying speed, and the blocked O rings remain on the parts feeder Without stickiness and at a lower dynamic friction coefficient, the conveying speed is faster O Ring Leak Test:

Coating was applied to the vulcanization-molded O rings (inner diameter: 119.6 mm, thickness: 7 mm; bearing number: P120) in the same manner as described above, and the O rings were compressed 5%. Helium gas was introduced, and the amount of helium leaked at the time of 3 minutes after the introduction was measured using a helium leak detector. The results were evaluated according to the following criteria:
- ○: Low leak
- ×: High leak (4) Table 1 (Examples) and Table 2 (Comparative Examples) below show the measurement and evaluation results obtained in the above Examples and Comparative Examples, together with the amounts of the coating agent components (unit: part by weight; numerical values in parentheses indicate the weight percent of each component based on the total solid matters content).

TABLE 1

| | (Examples) | | | | |
|---|---|---|---|---|---|
| | 1 | 2 | 3 | 4 | 5 |
| [Coating agent component] | | | | | |
| PTFE emulsion | 98.3 (60%) | 108.2 (66%) | 108.2 (66%) | 98.4 (60%) | 65.6 (40%) |
| Urethane resin emulsion | 87.6 (24%) | 73.0 (20%) | 73.0 (20%) | 69.3 (19%) | 109.5 (30%) |
| Hydrogenated NBR emulsion | 39.5 (16%) | 17.3 (7%) | 17.1 (7%) | 17.3 (7%) | 29.6 (12%) |
| Acrylic resin emulsion | — | 15.6 (7%) | — | 15.5 (7%) | 40.0 (18%) |
| EVA emulsion | — | — | 12.5 (7%) | 12.5 (7%) | — |
| Distilled water | 101.1 | 119.3 | 119.6 | 117.5 | 88.6 |
| [Measurement and evaluation result] | | | | | |
| Dynamic friction coefficient | 0.5 | 0.3 | 0.3 | 0.3 | 0.5 |
| Bending test | ○ | ○ | ○ | ○ | ○ |
| Adhesion test | Δ | ○ | Δ | ○ | Δ |
| High-temperature and high-humidity test | Δ | Δ | ○ | ○ | ○ |
| Bleeding evaluation | ○ | ○ | ○ | ○ | ○ |
| Evaluation of O ring conveying properties | Δ | ○ | ○ | ○ | ○ |
| O ring leak test | ○ | ○ | ○ | ○ | ○ |

TABLE 2

| | (Comparative Examples) | | | | |
|---|---|---|---|---|---|
| | 1 | 2 | 3 | 4 | 5 |
| [Coating agent component] | | | | | |
| PTFE emulsion | 108.2 (60%) | 108.2 (66%) | — | — | 98.3 (60%) |
| Urethane resin emulsion | — | 146.0 (40%) | 273.7 (75%) | 182.5 (50%) | 87.6 (24%) |
| Hydrogenated NBR emulsion | — | — | 61.7 (25%) | — | 39.5 (16%) |
| NBR emulsion | — | — | — | — | 39.5 (16%) |
| Acrylic resin emulsion | 37.8 (17%) | — | — | 111.1 (50%) | — |
| EVA emulsion | 30.3 (17%) | — | — | — | — |
| Distilled water | 150.4 | 99.1 | — | 39.7 | 101.1 |
| [Measurement and evaluation result] | | | | | |
| Dynamic friction coefficient | 0.5 | 0.4 | 1.0 | 0.5 | 0.7 |
| Bending test | ○ | ○ | ○ | X | ○ |
| Adhesion test | X | Δ | X | Δ | X |
| High-temperature and high-humidity test | X | X | X | X | X |
| Bleeding evaluation | ○ | ○ | X | X | ○ |
| Evaluation of O ring conveying properties | ○ | ○ | X | ○ | ○ |
| O ring leak test | ○ | ○ | ○ | ○ | ○ |

The invention claimed is:

1. A coating agent composition comprising:
   (A) a polytetrafluoroethylene resin emulsion in an amount of 20 to 80 wt. %;
   (B) an urethane resin emulsion in an amount of 10 to 50 wt. %; and
   (C) a hydrogenated NBR emulsion in an amount of 3 to 40 wt. %, wherein the only NBR used in the composition is hydrogenated NBR.

2. The coating agent composition according to claim 1, further comprising:
(D) an acrylic resin emulsion and/or an ethylene-vinyl acetate copolymer resin emulsion.

3. The coating agent composition according to claim 2, wherein component (D) is present in an amount of greater than 0 to 50 wt. %.

4. The coating agent composition according to claim 2, wherein each component is contained as a resin solid matter at the following ratio:
component (A): 30 to 70 wt. %;
component (B): 15 to 40 wt. %;
component (C): 5 to 40 wt. %; and
component (D): 5 to 30 wt. %.

5. The coating agent composition according to claim 2, wherein polytetrafluoroethylene resin particles having a number average molecular weight Mn of $2\times10^4$ to $1\times10^7$ and an average particle diameter of 200 to 500 nm are used to form the emulsion as component (A).

6. The coating agent composition according to claim 2, which is used as a surface coating agent for a vulcanized rubber-molded product.

7. The coating agent composition according to claim 6, which is used as a surface coating agent for a vulcanized rubber-molded product of NBR, hydrogenated NBR, acrylic rubber, or fluororubber.

8. A vulcanized rubber-molded product having a surface coated with the coating agent composition according to claim 6.

9. The coating agent composition according to claim 1, wherein polytetrafluoroethylene resin particles having a number average molecular weight Mn of $2\times10^4$ to $1\times10^7$ and an average particle diameter of 200 to 500 nm are used to form the emulsion as component (A).

10. The coating agent composition according to claim 1, which is used as a surface coating agent for a vulcanized rubber-molded product.

11. The coating agent composition according to claim 10, which is used as a surface coating agent for a vulcanized rubber-molded product of NBR, hydrogenated NBR, acrylic rubber, or fluororubber.

12. A vulcanized rubber-molded product having a surface coated with the coating agent composition according to claim 10.

* * * * *